(12) United States Patent
Zhu

(10) Patent No.: US 11,683,435 B2
(45) Date of Patent: Jun. 20, 2023

(54) IMAGE FORMING CONTROL METHOD, IMAGE FORMING CONTROL APPARATUS, AND IMAGE FORMING APPARATUS, BASED ON SHEET FEED DIRECTION

(71) Applicant: Zhuhai Pantum Electronics Co., Ltd., Zhuhai (CN)

(72) Inventor: Ran Zhu, Zhuhai (CN)

(73) Assignee: ZHUHAI PANTUM ELECTRONICS CO., LTD., Zhuhai (CN)

( * ) Notice: Subject to any disclaimer, the term of this patent is extended or adjusted under 35 U.S.C. 154(b) by 0 days.

(21) Appl. No.: 17/695,212

(22) Filed: Mar. 15, 2022

(65) Prior Publication Data

US 2022/0303425 A1  Sep. 22, 2022

(30) Foreign Application Priority Data

Mar. 22, 2021 (CN) .......................... 202110304148.4

(51) Int. Cl.
  *H04N 1/00* (2006.01)
  *H04N 1/23* (2006.01)

(52) U.S. Cl.
  CPC ....... *H04N 1/2315* (2013.01); *H04N 1/00639* (2013.01); *H04N 1/2346* (2013.01); *H04N 1/2369* (2013.01); *H04N 1/2376* (2013.01)

(58) Field of Classification Search
  None
  See application file for complete search history.

(56) References Cited

U.S. PATENT DOCUMENTS

| | | | |
|---|---|---|---|
| 6,336,011 B1* | 1/2002 | Sumio | H04N 1/2307 399/82 |
| 9,405,257 B2* | 8/2016 | Osada | G03G 15/6541 |
| 9,715,354 B2* | 7/2017 | Tachibana | B65H 7/20 |
| 9,898,237 B1 | 2/2018 | Soriano | |
| 9,969,591 B2* | 5/2018 | Kanematsu | G03G 15/6594 |
| 2007/0057426 A1* | 3/2007 | Tao | G03G 15/6582 270/58.09 |

(Continued)

FOREIGN PATENT DOCUMENTS

| CN | 101738900 A | 6/2010 |
|---|---|---|
| CN | 102665021 A | 9/2012 |

(Continued)

*Primary Examiner* — Henok Shiferaw
(74) *Attorney, Agent, or Firm* — Anova Law Group, PLLC

(57) ABSTRACT

Embodiments of the present disclosure provide an image forming control method, an image forming apparatus, and a non-transitory storage medium. The image forming control method includes acquiring job data and job parameters corresponding to the job data, where the job parameters include an image post-processing direction and a job data direction; determining a sheet feed direction based on the image post-processing direction and the job data direction in conjunction with a pre-stored corresponding relationship for characterizing a preset image post-processing direction, a preset job data direction, and a preset sheet feed direction; and based on the sheet feed direction, the job data, the job data direction, and the image post-processing direction, controlling an image forming device to perform an image forming operation, and controlling an image post-processing device to perform an image post-processing operation.

12 Claims, 9 Drawing Sheets

(56) References Cited

U.S. PATENT DOCUMENTS

| | | | |
|---|---|---|---|
| 2008/0088875 A1 | 4/2008 | Taira | |
| 2010/0123940 A1* | 5/2010 | Kamisuwa | G03G 15/607 358/452 |
| 2012/0092707 A1* | 4/2012 | Saito | H04N 1/00458 358/1.15 |
| 2014/0023418 A1* | 1/2014 | Kashiwagi | G03G 15/502 399/410 |
| 2016/0187832 A1* | 6/2016 | Kanamoto | G03G 15/6544 399/408 |

FOREIGN PATENT DOCUMENTS

| | | |
|---|---|---|
| CN | 103182859 A | 7/2013 |
| CN | 110182643 A | 8/2019 |
| EP | 1764227 A2 | 3/2007 |
| JP | 2002196625 A | 7/2002 |
| JP | 2013215990 A | 10/2013 |
| JP | 2016107536 A | 6/2016 |

\* cited by examiner

IMAGE FORMING CONTROL METHOD, IMAGE FORMING CONTROL APPARATUS, AND IMAGE FORMING APPARATUS, BASED ON SHEET FEED DIRECTION

CROSS-REFERENCE TO RELATED APPLICATION

This application claims the priority to Chinese patent application No. 202110304148.4, filed on Mar. 22, 2021, in the China National Intellectual Property Administration, the entirety of which is incorporated herein by its reference.

TECHNICAL FIELD

The present disclosure generally relates to the field of image forming technology and, more particularly, relates to an image forming control method, an image forming control apparatus, and an image forming apparatus.

BACKGROUND

An image forming apparatus may integrate image formation and image post-processing. To ensure the image forming speed, an image forming mechanism may preferentially select long edge feed, but the long edge feed may not meet the post-processing requirement, resulting in poor user experience.

SUMMARY

One aspect of the present disclosure provides an image forming control method. The method includes acquiring job data and job parameters corresponding to the job data, where the job parameters include an image post-processing direction and a job data direction; determining a sheet feed direction based on the image post-processing direction and the job data direction in conjunction with a pre-stored corresponding relationship for characterizing a preset image post-processing direction, a preset job data direction, and a preset sheet feed direction; and based on the sheet feed direction, the job data, the job data direction, and the image post-processing direction, controlling an image forming device to perform an image forming operation, and controlling an image post-processing device to perform an image post-processing operation.

Another aspect of the present disclosure provides an image forming apparatus including an image forming control apparatus. The image forming control apparatus includes a memory for storing a computer program for an image forming control method; and a processor coupled to the memory and configured, when the computer program being executed, to: acquire job data and job parameters corresponding to the job data, where the job parameters include an image post-processing direction and a job data direction; determine a sheet feed direction based on the image post-processing direction and the job data direction in conjunction with a pre-stored corresponding relationship for characterizing a preset image post-processing direction, a preset job data direction, and a preset sheet feed direction; and based on the sheet feed direction, the job data, the job data direction, and the image post-processing direction, control an image forming device to perform an image forming operation, and control an image post-processing device to perform an image post-processing operation.

Another aspect of the present disclosure provides a non-transitory computer-readable storage medium containing a computer program, and when being executed, the computer program causes a processor to implement an image forming control method. The method includes acquiring job data and job parameters corresponding to the job data, where the job parameters include an image post-processing direction and a job data direction; determining a sheet feed direction based on the image post-processing direction and the job data direction in conjunction with a pre-stored corresponding relationship for characterizing a preset image post-processing direction, a preset job data direction, and a preset sheet feed direction; and based on the sheet feed direction, the job data, the job data direction, and the image post-processing direction, controlling an image forming device to perform an image forming operation, and controlling an image post-processing device to perform an image post-processing operation.

Other aspects of the present disclosure can be understood by those skilled in the art in light of the description, the claims, and the drawings of the present disclosure.

BRIEF DESCRIPTION OF THE DRAWINGS

To clearly explain the technical solutions of embodiments of the present disclosure or the existing technology, the drawings need to be used for describing embodiments or existing technology are described below. Obviously, the drawings in the following description are merely some embodiments of the present disclosure. For those skilled in the art, other drawings may be obtained in accordance with these drawings without creative efforts.

DETAILED DESCRIPTION

To conveniently understand the present disclosure, the present disclosure is more fully described with reference to relevant drawings. Drawings may provide optional embodiments of the present disclosure. However, the present disclosure may be implemented in multiple different forms and may not be limited to embodiments described in the specification. On the contrary, the purpose of providing those embodiments may be to more thoroughly and comprehensively understood the present disclosure.

Unless otherwise defined, all technical and scientific terms used herein are commonly understood by those skilled in the art. The terms used herein in the specification of the present disclosure may be intended to describe embodiments and may not be intended to limit the present disclosure.

Figure 1:
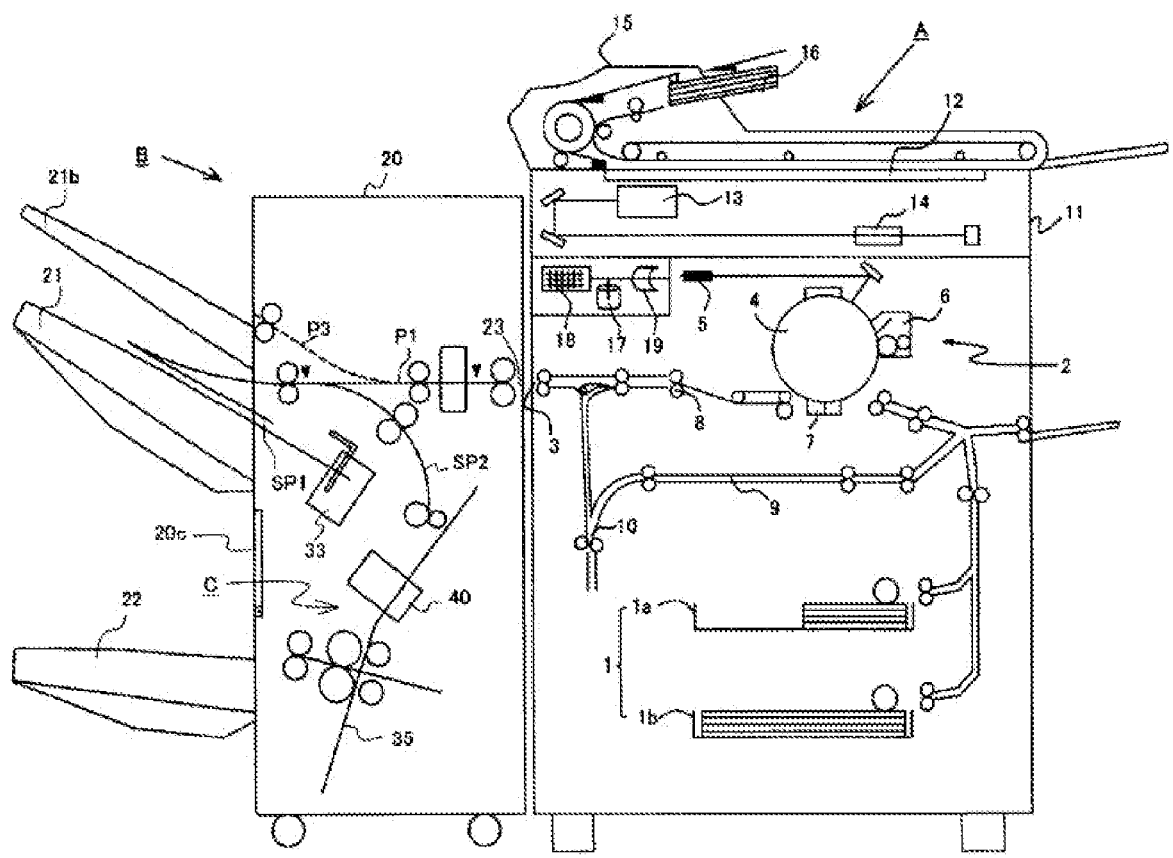
FIG. 1 illustrates a structural schematic of an image forming apparatus provided by exemplary embodiments of the present disclosure.

Referring to FIG. 1, an image forming apparatus may include an image forming device A and an image post-processing device B. Exemplarily, the image forming device A may be an inkjet printer, a laser printer, an LED (light-emitting diode) printer, a copier, a scanner, a multi-functional all-in-one fax machine, a multi-function peripheral (MFP) for performing equal functions in a single device, or the like, which may not be limited according to various embodiments of the present disclosure. The image post-processing device B may be used to perform image post-processing operations such as binding, punching, folding, and the like. In the image forming device A shown in FIG. 1, sheets may be conveyed from a paper feed part 1 to an image forming part 2; and after printing on the sheets by the image forming part 2, the sheets may be conveyed out from a main body paper exit 3. In the paper feed part 1, various sheets with various sizes may be contained in paper feed trays 1a and 1b, and the sheets may be specified separated sheet by sheet and conveyed to the image forming part 2. The dimensions of the sheets may be A4, A5, A6, B5, and the like. The sheets contained in the paper feed trays 1a and 1b may be, for example, the sheets of A4. The paper feed tray 1a may convey the sheets to the image forming part 2 along the direction of the short edge of the sheet A4, and the paper feed tray 1b may convey the sheets to the image forming part 2 along the direction of the long edge of the sheet A4.

The image forming part 2 may be configured with, for example, an electrostatic drum 4, and a print head (laser emitter) 5, a developing element 6, a transfer charger 7, and a fixing element 8 which are configured around the electrostatic drum 4. An electrostatic latent image may be formed on the electrostatic drum 4 by the laser emitter 5; the toner may be attached on the electrostatic latent image by the developing element 6; and the image may be transferred on the sheets by the transfer charger 7 and may be heat-fixed by the fixing element 8. The sheets with formed imaged may be sequentially fed out from the main body paper exit 3. The image forming apparatus in FIG. 1 may further include a circulation path 9. Along the circulation path 9, after the sheet printed on the outer side from the fixing element 8 is reversed from the inside to the outside through the main body redirection path 10, the sheet may be re-conveyed to the image forming part 2, and double-sided printing may be performed on the inner side of the sheet. In such way, the double-sided printed sheet may be reversed from the inside to the outside through the main body redirection path 10 and then conveyed out from the main body paper exit 3.

The image forming apparatus in FIG. 1 may further include an image reading apparatus 11. A scanning component 13 may scan a manuscript sheet configured on a platen 12, and image data may be electronically read by an electrical conversion component which is not shown in FIG. 1. The image data may be, for example, digitally processed by an image processing part to generate an image signal which is then transferred to a data storage part 14, and the data storage unit 14 may sent the image signal to the above-mentioned laser emitter 5. In addition, the image forming apparatus in FIG. 1 may further include a manuscript conveying apparatus 15 for conveying the manuscript sheets stored in the stacker 16 to the feed apparatus of the platen 12.

The image forming device A may be further configured with a control part; and the control part may include a storage part 17, a control panel 18, and a buffer 19. The control panel 18 may configure image forming conditions such as sheet size designation, color monochrome print designation, print number designation, single-sided/double-sided print designation, enlargement reduction print designation, and the like. In the image forming device A, the image data read by the above-mentioned scanning component 13 or the image data transferred from the outside Internet may be stored in the data storage part 17, the image data may be transferred from the data storage part 17 to the buffer 19, and the image data may be sequentially transferred from the buffer 19 to the laser emitter 5.

Image post-processing conditions may also be configured in the above-mentioned control panel 18. In the image post-processing conditions, for example, "print and output mode", "binding mode", "sheet stacking and folding mode" and the like may be specified. In addition, the image forming device A and the image post-processing device B may perform image formation on sheets and sheet image post-processing corresponding to the image forming conditions and the image post-processing conditions.

Therefore, in the image forming device A, image formation may be performed on a series of sheets from the 1st page to the nth page sequentially. In the image post-processing device B, the sheets conveyed from the main body paper exit 3 of the image forming device A may be received, and the processing such as binding, punching, and folding may be performed on the sheets conveyed out from the main body paper exit 3 of the image forming device A. It may also be that no processing may be performed on the sheets conveyed out from the main body paper exit 3 of the image forming device A. Sheets conveyed out from the main body exit 3 of the image forming device A may be loaded and contained in the first paper discharge tray 21 provided in the image post-processing device B. If the sheets need to be bound, the first paper discharge tray 21 may feed the sheets to the end-surface binding mechanism 33 for binding.

A housing 20, including the first paper discharge tray 21 and the second paper discharge tray 22, may be configured with a sheet feed path P1 of a feed entrance 23 connected to the main body paper exit 3. The sheet feed path P1 may be formed by a substantially horizontal straight path in the housing 20. In addition, branches of the sheet feed path P1, including the first re-direction conveyance path SP1 and the second re-direction conveyance path SP2 for conveying sheets in the reverse direction, may be configured. Furthermore, the first re-direction conveyance path SP1 may be on the downstream side of the path, and the second re-direction conveyance path SP2 may be on the upstream side of the path, which may be branched from the sheet feed path P1, respectively. Two conveyance paths may be configured to be oppositely spaced from each other.

The housing 20 may be configured with an open/close cover 20c, which may form an opening part for maintaining the center binding mechanism 40 to be mentioned below. In addition, the end-surface binding mechanism 33 may be configured on the conveyance path of the first paper discharge tray 21, and the middle binding mechanism 40 may be configured on the stacking guide element 35. As shown in FIG. 1, these binding mechanisms may be configured at adjacent up-down positions adjacent through a manner that the end-surface binding mechanism 33 may be located above and the middle binding mechanism 40 may be located below.

In such way, the open/close cover for maintaining the middle binding mechanism 40 may be configured at the middle position between the first paper discharge tray 21 and the second paper discharge tray 22 which are arranged in an up-own manner. The middle binding mechanism 40 may bind the sheets that have reached the second paper discharge tray 22 on the lower side. Therefore, the middle binding mechanism 40 may be easily maintained from the open/close cover 20c. In addition, in such configuration, the work region is secured by removing loaded sheets on the second discharge tray 22 located on the lower side, such that the structure may be simple, and maintenance operation may be easy.

In addition, according to an up-down manner, the first paper discharge tray 21 may be at the upper side of paper discharge trays with two upper and lower layers, and the open/close cover for maintaining the middle binding mechanism 40 of the sheets reaching the second paper discharge tray 22 may be configured in the moving track of the first paper discharge tray. Therefore, the first paper discharge tray may be moved above or below the open/close cover when performing maintenance work, so that the work region may be secured, the maintenance work may be safe and easy, and the apparatus may be formed into a small and compact size.

In addition, the above-mentioned first paper discharge tray 21 may be automatically returned to the upper or lower side of the open/close cover 20c through a staple empty signal and an operation failure signal of the middle binding mechanism 40, and the open/close cover 20c may be easily opened and closed.

To ensure the image forming speed, the above-mentioned image forming device A may select the paper feed tray that feeds the sheets along the long edge (i.e., long edge feed) to the paper feed tray of the image forming part 2. However, the long edge feed may not meet image post-processing requirements. For example, when the job data direction is vertical layout and top/bottom binding is required, the long edge feed may not meet the binding requirement, the image post-processing device B may not perform post-processing on the sheets conveyed out by the image forming device A, which may result in poor user experience.

Figure 2:
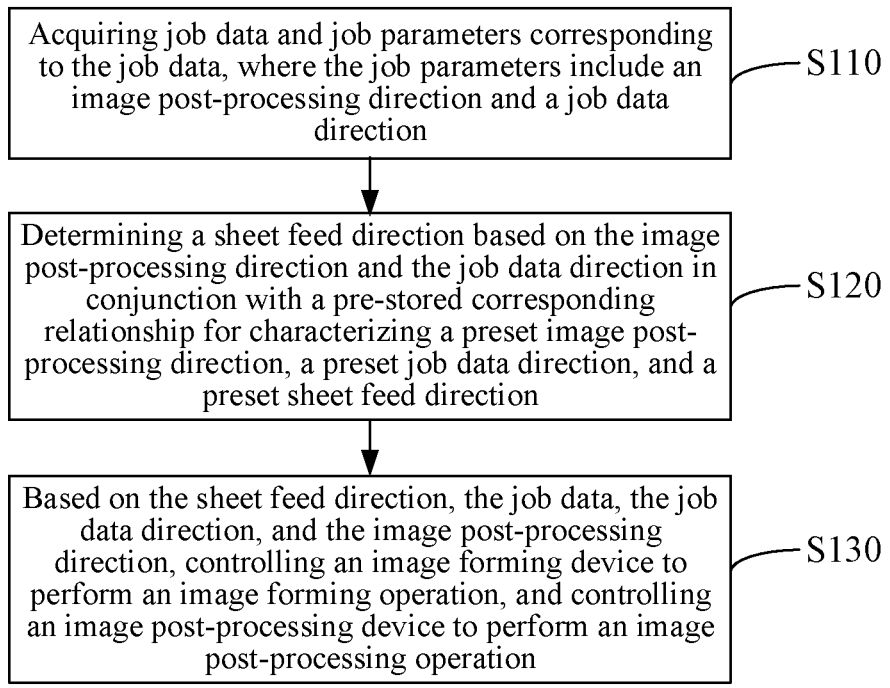
FIG. 2 illustrates a flowchart of an image forming control method provided by exemplary embodiments of the present disclosure.

Therefore, embodiments of the present disclosure provide an image forming control method, which is applied to an image forming control apparatus. Referring to FIG. 2, the method may include following exemplary steps.

At S110, job data and job parameters corresponding to the job data may be acquired, where the job parameters may include an image post-processing direction and a job data direction.

The job data may also be called image data. The job data may be the data to be printed received from a terminal device connected to the image forming device A, and may be the image data obtained by reading the manuscript sheets placed on the platen 12 by the image reading apparatus 11 of the image forming device A. The terminal device may be a desktop computer, a notebook computer, a tablet computer, a mobile phone, a personal digital assistant (PDA), or other devices, which may not be limited according to various embodiments of the present disclosure.

The job parameters corresponding to job data may include image forming parameters and image post-processing parameters. The image forming parameters may include, for example, a job data direction, a quantity of copies, color printing or black/white printing, duplex printing or single-sided printing, and the like. The job data direction may be, for example, a horizontal layout or a vertical layout. Exemplarily, the job data direction of the job data shown in FIG. 3A may be a horizontal layout, and the job data direction of the job data shown in FIG. 3B may be a vertical layout. The image post-processing parameters may include, for example, an image post-processing direction; and the image post-processing direction may include, for example, a binding direction, a punching direction, a folding direction, or the like. The binding direction of the sheet may be the top or bottom end or left or right side of the sheet, the punching direction of the sheet may be the top or bottom end or left or right side of the sheet, and the folding direction of the sheet may be horizontal or vertical. For the convenience of description, exemplarily, the image post-processing may be the binding process. Those skilled in the art can understand that related description of the binding process may be also applicable to other image post-processing operations, which may not be described in detail herein.

The acquired job data and job parameters corresponding to the job data may be stored in the storage part 17.

At S120, the sheet feed direction may be determined based on the image post-processing direction and the job data direction in conjunction with the pre-stored corresponding relationship for characterizing a preset image post-processing direction, a preset job data direction, and a preset sheet feed direction.

For example, S120 may include following exemplary steps.

At S121, the sheet feed direction may be determined directly based on the image post-processing direction, the job data direction and the pre-stored corresponding relationship for characterizing the pre-stored characterizing preset image post-processing direction, the preset job data direction, and the preset sheet feed direction.

The corresponding relationship for characterizing the preset image post-processing direction, the preset job data direction, and the preset sheet feed direction is shown in FIG. 1. When the image post-processing direction of the sheet is left or right binding, and the job data direction of the sheet is vertical layout, the preset sheet feed direction may be long edge feed; when the image post-processing direction of the sheet is top or bottom binding, and the job data direction of the sheet is vertical layout, the sheet feed direction may be short edge feed; when the image post-processing direction of the sheet is left or right binding, and the job data direction of the sheet is horizontal layout, the sheet feed direction may be short edge feed; and when the image post-processing direction of the sheet is top or bottom binding, and the job data direction of the sheet is horizontal layout, the sheet feed direction may be long edge feed.

TABLE 1

| Image Post-Processing direction | Job data direction | Preset feed direction |
| --- | --- | --- |
| Left or right side | Vertical layout | Long edge feed |
| Top or bottom | Vertical layout | Short edge feed |
| Left or right side | Horizontal layout | Short edge feed |
| Top or bottom | Horizontal layout | Long edge feed |

It should be noted that the above-mentioned corresponding relationship may be stored in a storage unit of the image forming apparatus or may be directly configured in a computer program running in the image forming apparatus, which may not be limited according to various embodiments of the present disclosure.

After the image post-processing direction and the job data direction are acquired, the sheet feed direction may be directly determined without user operation, which brings convenience to the user.

Figure 3A:
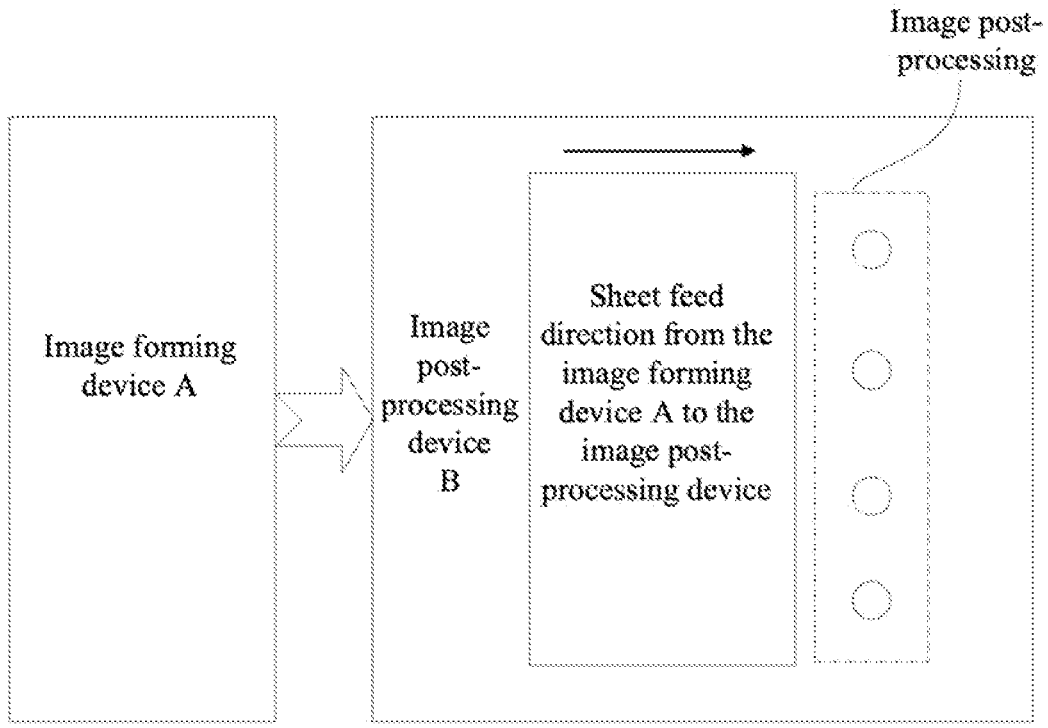
FIG. 3A illustrates a schematic of a sheet feeding from an image forming device A into an image post-processing device B.
Figure 3B:
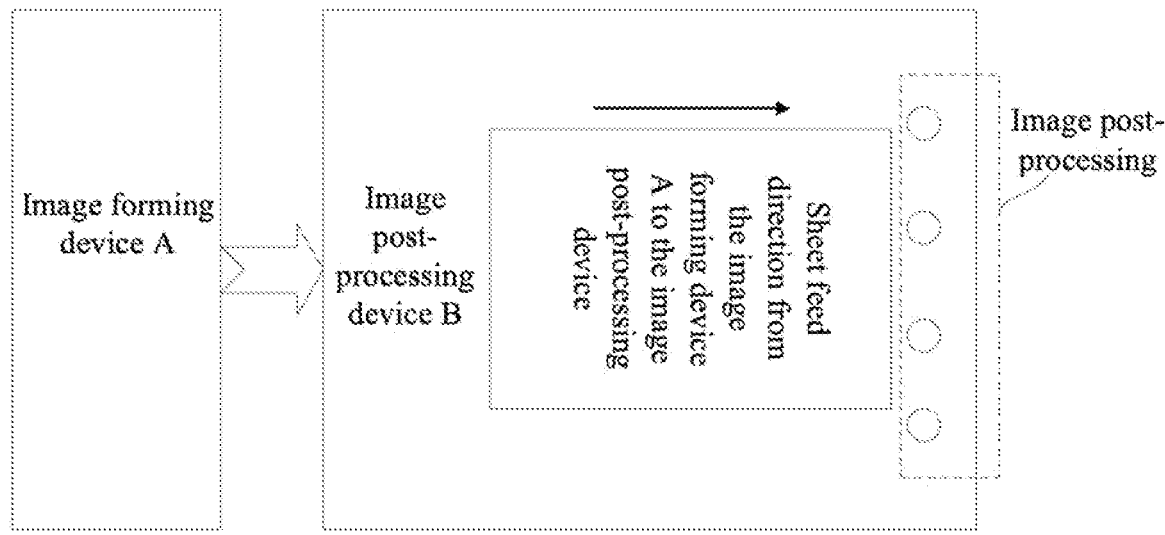
FIG. 3B illustrates another schematic of a sheet feeding from an image forming device A into an image post-processing device B.
Figure 3C:
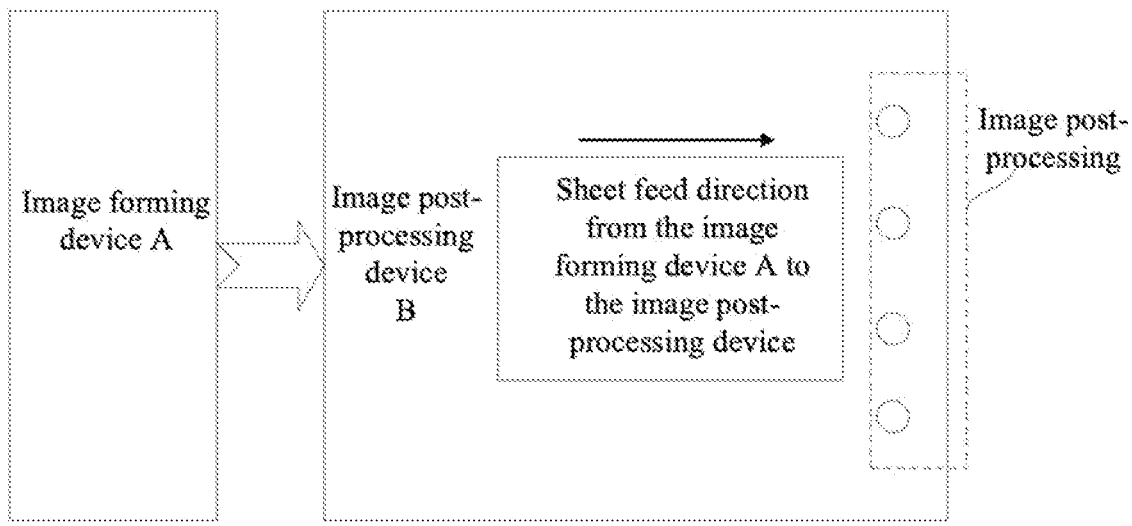
FIG. 3C illustrates another schematic of a sheet feeding from an image forming device A into an image post-processing device B.
Figure 3D:
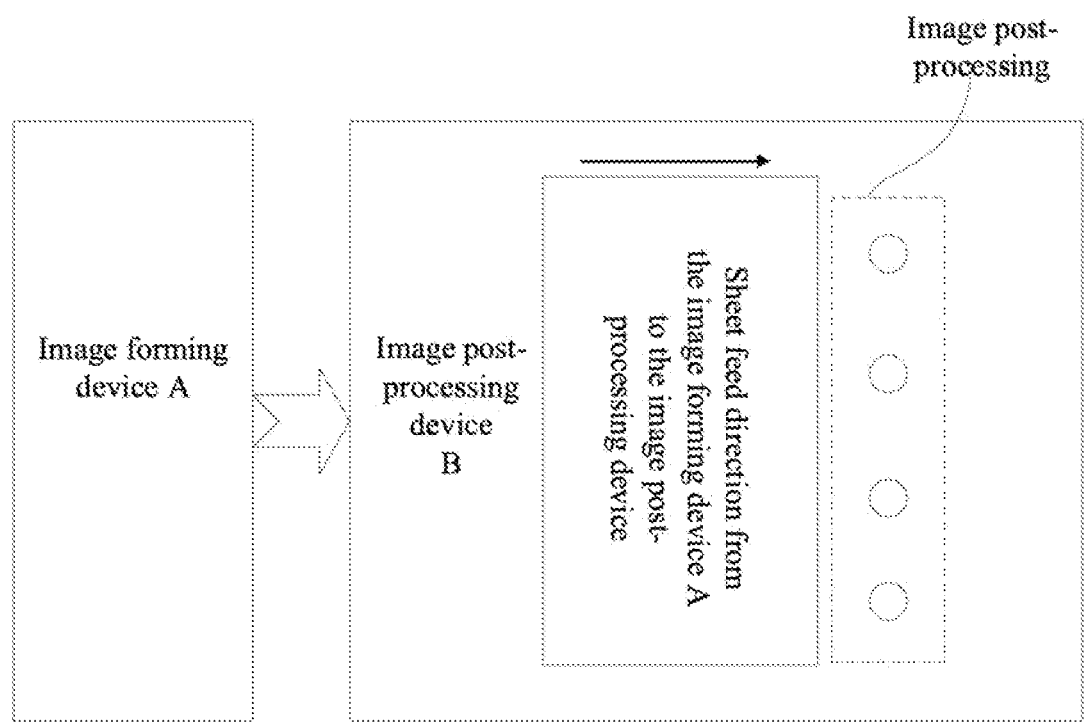
FIG. 3D illustrates another schematic of a sheet feeding from an image forming device A into an image post-processing device B.

As shown in FIGS. 3A-3D, after the image is formed on the sheet in the image forming device A, the sheet may be conveyed to the image post-processing device B by the image forming device A for image post-processing. As shown in FIG. 3A, when the image post-processing direction of the sheet is left or right, and the job data direction of the sheet is vertical layout, the sheet may need to be fed into the image post-processing device B with the long edge before image post-processing can be performed; otherwise, the image post-processing may be invalid. As shown in FIG. 3B, when the image post-processing direction of the sheet is top or bottom, and the job data direction of the sheet is vertical layout, the sheet may need to be fed into the image post-processing device B with the short edge before image post-processing can be performed; otherwise, the image post-processing may be invalid. As shown in FIG. 3C, when the image post-processing direction of the sheet is left or right, and the job data direction of the sheet is horizontal layout, the sheet may need to be fed into the image post-processing device B with the short edge before image post-processing can be performed; otherwise, the image post-processing may be invalid. As shown in FIG. 3D, when the image post-processing direction of the sheet is the top or bottom, and the job data direction of the sheet is horizontal layout, the sheet may need to be fed into the image post-processing device B with the long edge before image post-processing can be performed, otherwise the image post-processing may be invalid.

Figure 4:
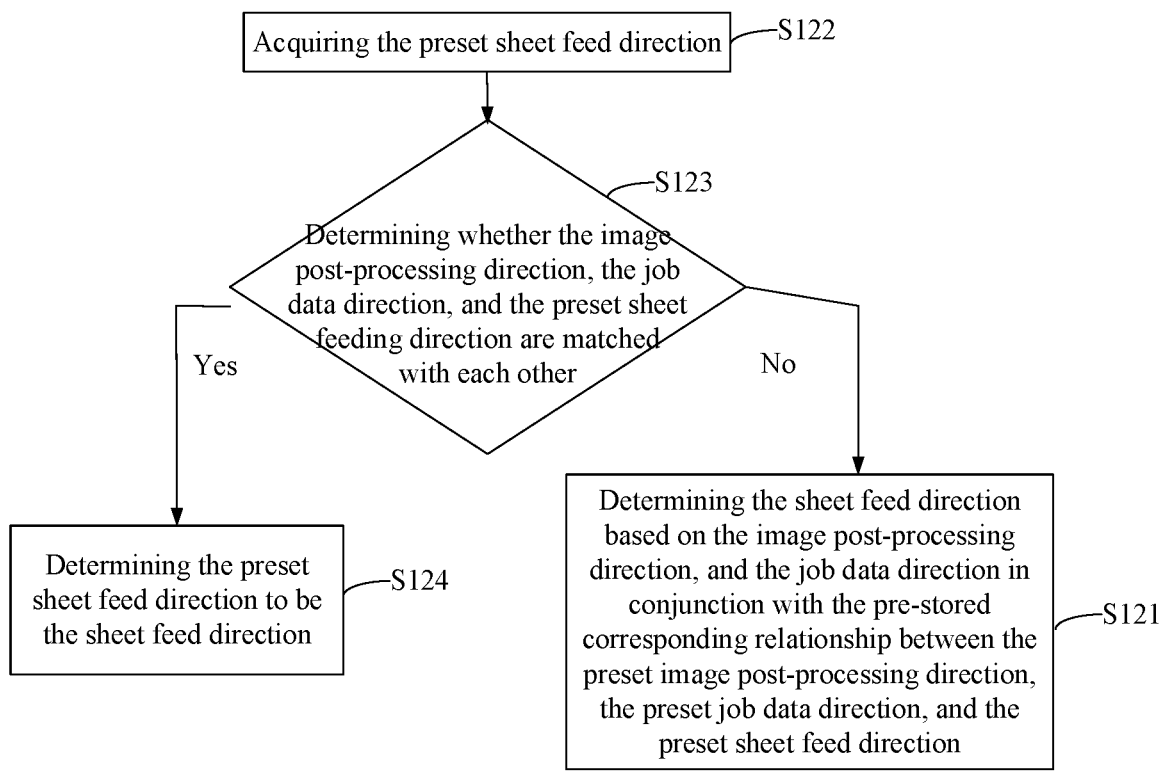
FIG. 4 illustrates a sub-flowchart of an image forming control method provided by exemplary embodiments of the present disclosure.

Referring to FIG. 4, in addition, the above-mentioned S120 may further include following exemplary steps.

At S122, the preset sheet feed direction may be acquired.

At S123, whether the image post-processing direction, the job data direction, and the preset sheet feed direction are matched with each other may be determined. If yes, execute S124; and if not, execute S121.

At S124, the preset sheet feed direction may be configured as the sheet feed direction corresponding to the job data.

The preset sheet feed direction may be configured by a user on a user interface of a driving program corresponding to the image forming device A, a webpage interface corresponding to a server built in the image forming device A, or a control panel of the image forming device A. The user interface may further include a user interface configured for characterization of prompting the user to select the sheet feed direction, which may not be limited according to various embodiments of the present disclosure.

The image forming control device may, for example, determine whether the image post-processing direction, the job data direction, and the preset sheet feed direction are matched with each other, based on the pre-stored corresponding relationship for characterizing the preset image post-processing direction, the preset job data direction, the preset sheet feed direction, and the acquired image post-processing direction and job data direction. If they are matched with each other, that is, the image processing direction, the job data direction, and the preset sheet feed direction satisfy the above-mentioned corresponding relationship, then it may determine that the sheet feed direction corresponding to the job data is the preset sheet feed direction; and if they are not matched with each other, execute S121.

At S130, based on the sheet feed direction, the job data, the job data direction, and the image post-processing direction, the image forming device may be controlled to perform the image forming operation, and the image post-processing device may be controlled to perform the image post-processing operation.

For example, the image forming device may form the job data on the sheet based on the job data direction. For example, when the job data direction is vertical layout, the image forming device may form the job data on the sheet in the form of vertical layout. The image post-processing device may perform the image post-processing operation on the sheet with the formed image based on the sheet feed direction, the job data direction, and the image post-processing direction. For example, when the sheet feed direction is long edge feed and the job data direction of the sheet is horizontal layout, the image post-processing device may perform top or bottom binding on the sheet with the formed image.

In the image forming control method of the present disclosure, the sheet feed direction may be determined according to the image post-processing direction and the job data direction; and the image forming device may be controlled to perform the image forming operation and the image post-processing device may be controlled to perform the image post-processing operation based on the sheet feed direction, the job data, the job data direction, and the image post-processing direction. Therefore, the sheet feed direction can be matched with the image post-processing direction, and the image post-processing device can perform the image post-processing operation on the sheet, thereby meeting the user's image post-processing requirement.

In one embodiment, for S120, the sheet feed direction may be determined based on the image post-processing direction and the job data direction in conjunction with the pre-stored corresponding relationship for characterizing the preset image post-processing direction, the preset job data direction, and the preset sheet feed direction, which may further include acquiring a job processing mode, and determining whether the job processing mode is a preset first mode, where when the job processing mode is the preset first mode, the sheet feed direction may be determined based on the image post-processing direction and the job data direction in conjunction with the pre-stored corresponding relationship for characterizing the preset image post-processing direction, the preset job data direction, and the preset sheet feed direction.

The image forming control apparatus may include multiple job processing modes and may perform different operations for different job processing modes.

The job processing mode can be configured by the user on the user interface of the driving program corresponding to the image forming device A, the webpage interface corresponding to the server built in the image forming device A, or the control panel of the image forming device A. The user interface may further include a user interface configured for characterization of prompting the user to select the job processing mode, which may not be limited according to various embodiments of the present disclosure. In addition, the job processing mode may also be automatically determined by the image forming control apparatus according to a preset rule.

The preset first mode may be, for example, an "image post-processing adaptation" mode. When the job processing mode is the "image post-processing adaptation" mode, the user's image post-processing needs may be prioritized. In the "image post-processing adaptation" mode, the sheet feed direction may be determined by the image post-processing direction and the job data direction in conjunction with the pre-stored corresponding relationships described above, and the image forming part 2 may select a corresponding sheet feed tray to load the sheet according to the sheet feed direction. For example, the pre-stored relationships for characterizing the preset image post-processing direction, the preset job data direction, and the preset sheet feed direction are shown in Table 1. When the image post-processing direction of the sheet is left or right binding, and the job data direction of the sheet is vertical layout in conjunction with the relationships shown in Table 1, the sheet feed direction may be determined to be long edge feed; the paper feed tray 1a is a paper feed tray for feeding the sheet to the image forming part 2 along the long edge feed direction, the paper feed tray 1b is a paper feed tray for feeding the sheet to the image forming part 2 along the short edge feed direction, and the image forming part 2 may select the paper feed tray 1a to load the sheet.

When there is no sheet with the sheet feed direction in the paper feed tray, a prompt message may be issued. The prompt message may be issued in the form of a pop-up window, and the user may add sheets to the paper feed tray according to the prompt message. For example, when the sheet feed direction is long edge feed, the paper feed tray 1a is a paper feed tray that feeds the sheet to the image forming part 2 along the long edge feed direction, and when there is no sheet in the paper feed tray 1a, a prompt message that there is no sheet in the paper feed tray 1a may be issued.

By determining whether the job processing mode is the preset first mode, when the job processing mode is the preset first mode, the sheet feed direction may be determined based on the image post-processing direction and the job data direction. Therefore, the sheet feed direction may be matched with the image post-processing direction, and the image post-processing device may perform image post-processing operations on the sheet, thereby meeting the user's image post-processing needs.

Figure 5:
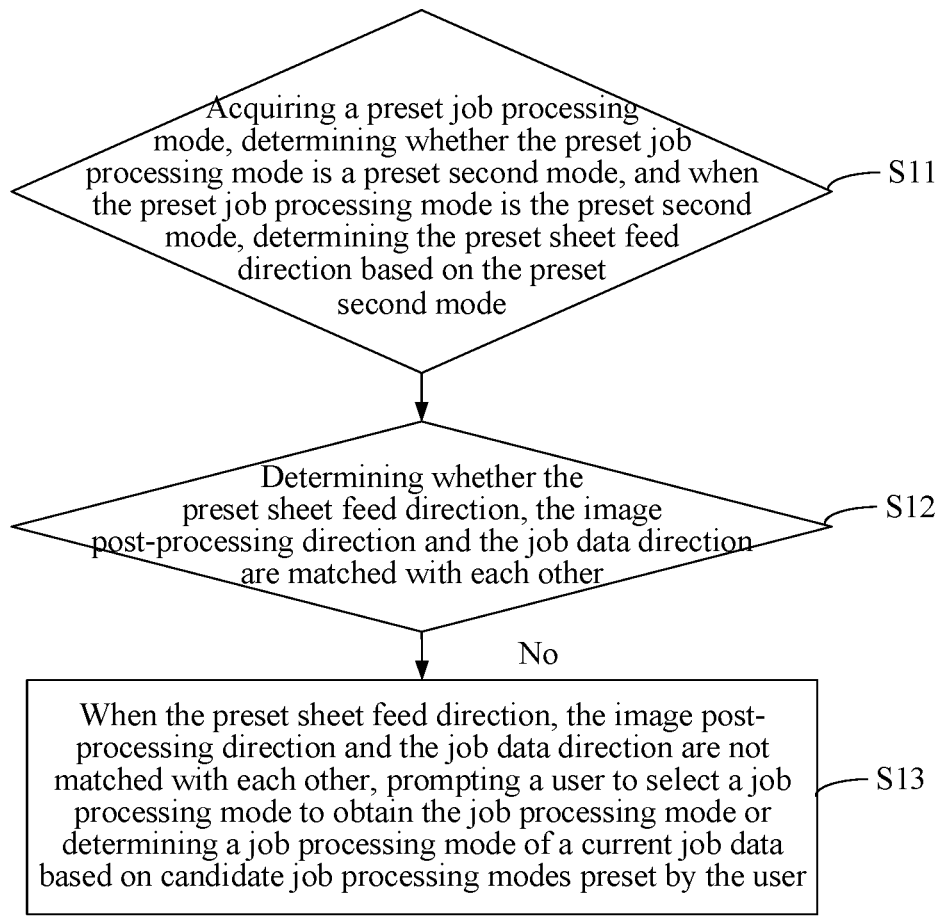
FIG. 5 illustrates another sub-flowchart of an image forming control method provided by exemplary embodiments of the present disclosure.

Referring to FIG. 5, in one embodiment, the above-mentioned acquiring the job processing mode may include, for example, following exemplary steps.

At S11, the preset job processing mode may be acquired, whether the preset job processing mode is a preset second mode may be determined, and when the preset job processing mode is the preset second mode, the preset sheet feed direction may be determined based on the preset second mode.

The preset second mode may be, for example, an "auto high speed" mode. In the "auto high speed" mode, the image forming speed may be prioritized. The image forming speed of the sheet from long edge feed is higher than the image forming speed of the sheet from the short edge feed. Therefore, in the "auto high speed" mode, the image forming part 2 may preferentially select the paper feed tray with long edge feed to load sheets. The preset sheet feed direction may correspond to the preset second mode. That is, when the preset job processing mode is the preset second mode, the preset sheet feed direction may be determined.

At S12, whether the preset feed direction, the image post-processing direction, and the job data direction are matched may be determined.

At S13, when the preset feed direction, the image post-processing direction, and the job data direction are not matched with each other, the user may be prompted to perform job processing mode selection to obtain the job processing mode, or the job processing mode of current job data may be determined based on candidate job processing modes preset by the user.

For example, when the preset sheet feed direction is long edge feed, the job data direction is vertical layout, and the image post-processing direction is top or bottom binding, the preset feed direction, the image post-processing direction, and the job data direction may not be matched with each other. The user may be prompted to perform job processing mode selection to obtain the job processing mode, or the job processing mode of current job data may be directly determined based on candidate job processing modes preset by the user.

When the preset job processing mode is the preset second mode, whether the preset feed direction, the image post-processing direction, and the job data direction are matched may be determined. When the preset feed direction, the image post-processing direction, and the job data direction are not matched with each other, the job processing mode may be re-determined. Therefore, it may avoid that the image post-processing operation is invalid; and by selecting a suitable job processing mode, the preset feed direction, image post-processing direction and job data direction may be matched with each other to meet the user's image post-processing needs.

In one embodiment, after acquiring the job processing mode, the method may further include determining whether the job processing mode is the preset second mode. When the job processing mode is the preset second mode, the preset sheet feed direction may be determined based on the preset second mode, and when it determines that the preset feed direction and the job data direction are not matched with each other, the image post-processing device may be controlled to stop performing the image post-processing operation.

When the preset feed direction, the image post-processing direction, and the job data direction are not matched with each other, based on the preset sheet feed direction, the job data, the job data direction and the image post-processing direction, the image forming device may be controlled to perform the image forming operation, and the image post-processing device may be controlled to stop performing the image post-processing operation, which may avoid errors in the image post-processing operation of the sheet by the image post-processing device. At this point, the image forming control device may use the preset feed direction as the sheet feed direction. In one embodiment, after the image forming device performs the image forming operation on the sheet, the image post-processing operation may be performed on the sheet by the user.

Figure 6:
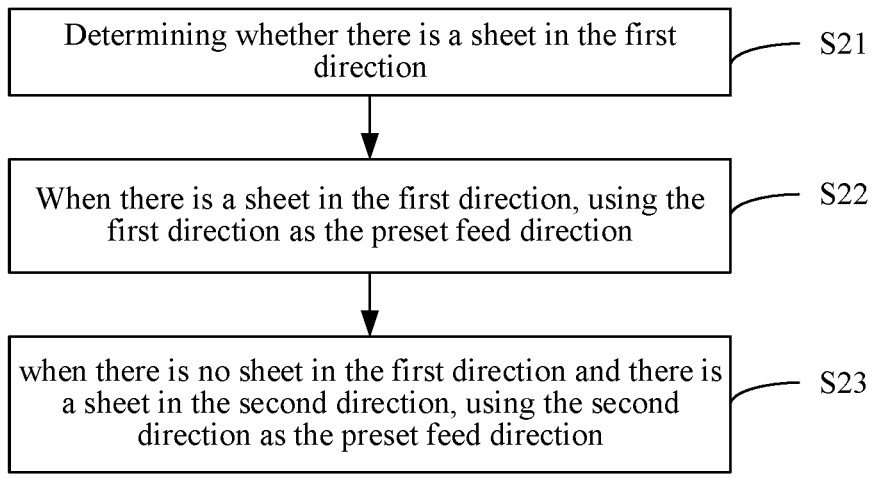
FIG. 6 illustrates another sub-flowchart of an image forming control method provided by exemplary embodiments of the present disclosure.

Referring to FIG. 6, in one embodiment, when the job processing mode is the default second mode, the preset sheet feed direction may be determined based on the preset second mode, which may include, for example, following exemplary steps.

At S21, whether there is a sheet in the first direction may be detected.

At S22, when there is a sheet in the first direction, the first direction may be used as the preset feed direction.

At S23, when there is no sheet in the first direction and there is a sheet in the second direction, the second direction may be used as the preset feed direction.

The sheet may normally have a regular shape, and common sheet such as paper may usually be rectangular, which may include long and short edges. The first direction may be long edge feed, and the second direction may be short edge feed. The paper feed tray 1a may contain sheets in the first direction, and the paper feed tray 1b may contain sheets in the second direction.

When the preset second mode is the "auto high speed" mode, the preset feed direction is long edge feed. When there are sheets in the first direction in the paper feed tray 1a, the long edge feed may be used as the preset feed direction; and when there are no sheets in the first direction in the paper feed tray 1a, the second direction may be used as the preset feed direction, and the image forming part 2 may load sheets in the second direction in the paper feed tray 1b. When there are no sheets in the first direction in the paper feed tray 1a and no sheets in the second direction in the paper feed tray 1b, a prompt message may be issued to prompt the user to add sheets.

The job processing mode may also be a preset third mode; and the preset third mode may be, for example, a "forced high speed" mode. In the "forced high speed" mode, the image forming section 2 may only load sheets of the long edge feed and may not load sheets of the short edge feed. When there are no sheets of the long edge feed in the paper feed tray, a prompt message may be issued to prompt the user to add sheets of the long edge feed to the paper feed tray. In the "forced high speed" mode, the image forming speed may be prioritized.

The job processing mode may also be a preset fourth mode; and the preset fourth mode may be, for example, a "forced speed regulation" mode. When the shape and/or thickness of the sheets is not a regular, the user may select the preset fourth mode, and the image forming device A may adjust the image forming speed as required. When loading sheets, the image forming part 2 may preferentially select the sheet feed tray of the long edge feed to load sheets, and when there are no sheets of the long edge feed in the paper feed tray, the sheets of the short edge feed may be loaded.

The job processing mode may also be automatically determined by the image forming control device according to a preset rule. For example, the image forming control device may automatically determine the job processing mode corresponding to the job data according to the feed direction of sheets in the paper feed tray of the image forming device. Or the image forming control device may automatically determine the job processing mode corresponding to current job data by collecting statistics on the job processing modes used within a certain period. The image forming control device may determine the job processing mode corresponding to current job data, by determining a preferred job processing mode of a user based on a corresponding relationship between users and their selected job processing modes.

The image forming control device automatically determines the job processing mode corresponding to the job data based on sheets, which may, for example, include:

acquiring the feed direction of the sheets in the paper feed tray of the image forming device; and determining the job processing mode based on the above-mentioned feed direction of the sheets in the paper feed tray, the job data direction, and the image post-processing direction in conjunction with the pre-stored corresponding relationship for characterizing the preset image post-processing direction, the preset job data direction, and the preset sheet feed direction.

For example, the pre-stored relationships for characterizing the preset image post-processing direction, the preset job data direction, and the preset sheet feed direction are shown in Table 1. When the feed direction of the sheets in the paper feed tray is long edge feed, the job data direction is vertical layout and the image post-processing direction is top or bottom, it may determine that the feed direction of sheets in the above-mentioned paper feed tray, the job data direction, and the image post-processing direction may not meet the job processing requirement of the "image post-processing adaptation" mode but meet the job processing requirement of the "automatic high speed" mode. Therefore, the image forming control apparatus may automatically determine that the job processing mode of current job data is the "auto high speed" mode. For example, when the feed direction of the sheets in the paper feed tray is long edge feed, the job data direction is vertical layout and the image post-processing direction is left or right, it may determine that the feed direction of the sheets in the above-mentioned paper feed tray, the job data direction, and the image post-processing direction may meet the job processing mode of the "image post-processing adaptation" mode. Therefore, the image forming control apparatus may automatically determine that the job processing mode of current job data is the "image post-processing adaptation" mode.

Furthermore, the image forming control apparatus may automatically determine the optimal job processing mode by collecting statistics of the job processing modes used within a certain period. The image forming control device may determine the job processing mode corresponding to current job data, by determining a preferred job processing mode of a user based on a corresponding relationship between users and their selected job processing modes. As a result, the job processing mode may be automatically determined based on the user's usage preference, and the user may not need to manually select the mode which is convenient to the user.

It should be noted that the above-mentioned various different job processing modes may be used as a whole new function, and some functions of user preset preferences or automatic identification of user preferences may be added to meet the needs of image formation and image post-processing; an optimal job processing mode may be selectively determined for different application scenarios, which may better meet the needs of different users or application scenarios which is convenient to users; a variety of different job processing modes may be set by the user in advance; if the job processing mode does not match the image post-processing direction during the image post-processing process, the image post-processing process may be automatically executed according to the job processing mode preset by the user according to its own need. Setting a variety of different job processing modes may provide the user with multiple choices when the job execution is abnormal, so that the image post-processing may be executed smoothly.

Figure 7:
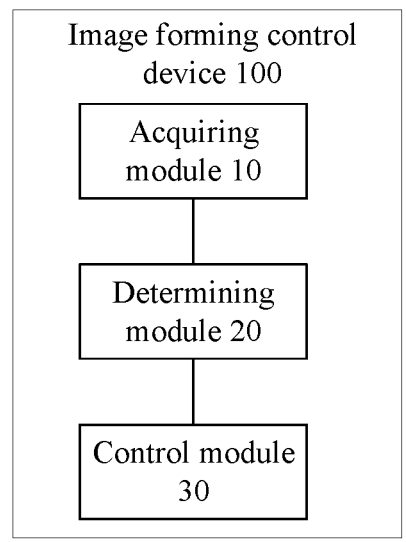
FIG. 7 illustrates a structural schematic of an image forming control apparatus provided by exemplary embodiments of the present disclosure.

Referring to FIG. 7, embodiments of the present disclosure further provide an image forming control apparatus 100. The image forming control apparatus 100 may include an acquiring module 10, a determining module 20, and a control module 30.

The acquiring module 10 may be configured to acquire the job data and the job parameters corresponding to the job data, where the job parameters include the image post-processing direction and the job data direction. The determining module 20 may be configured to determine the sheet feed direction based on the image post-processing direction and the job data direction in conjunction with the pre-stored corresponding relationship for characterizing the preset image post-processing direction, the preset job data direction, and the preset sheet feed direction. The control module 30 may be configured to control the image forming device to perform the image forming operation and control the image post-processing device to perform the image post-processing operation based on the sheet feed direction, the job data, the job data direction, and the image post-processing direction.

Figure 8:
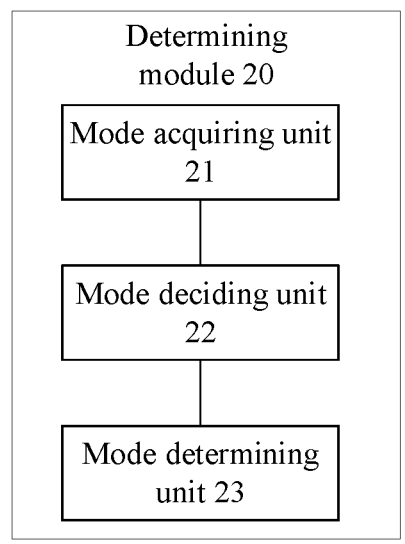
FIG. 8 illustrates a structural schematic of a determining module provided by exemplary embodiments of the present disclosure.

Referring to FIG. 8, in one embodiment, the determining module 20 may include a mode acquiring unit 21, a mode deciding unit 22, and a mode determining unit 23. The mode acquiring unit 21 may be used to acquire the job processing mode. The mode determining unit 22 may be configured to decide whether the job processing mode is the preset first mode. When the job processing mode is the preset first mode, the mode determining unit 23 may be configured to determine the sheet feed direction based on the image post-processing direction and the job data direction in conjunction with the pre-stored corresponding relationship for characterizing the preset image post-processing direction, the preset job data direction, and the preset sheet feed direction.

Figure 9:
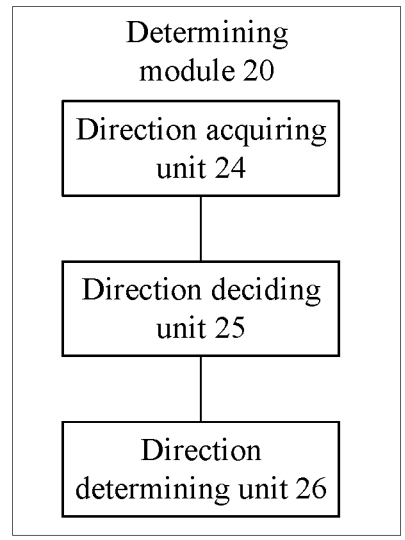
FIG. 9 illustrates a structural schematic of another determining module provided by exemplary embodiments of the present disclosure.

Referring to FIG. 9, in one embodiment, the determining module 20 may include a direction acquiring unit 24, a direction deciding unit 25, and a direction determining unit 26. The direction acquiring unit 24 may be configured to acquire the preset sheet feed direction. The direction deciding unit 25 may be configured to decide whether the preset sheet feed direction, the job data direction, and the image post-processing direction are matched with each other. When the preset sheet feed direction, the job data direction, and the image post-processing direction are matched with each other, the direction determining unit 26 may be configured to determine the preset sheet feed direction as the sheet feed direction. When the preset sheet feed direction, the job data direction, and the image post-processing direction are not matched with each other, the direction determining unit 26 may determine the sheet feed direction based on the image post-processing direction and the job data direction in conjunction with the pre-stored corresponding relationship for characterizing the preset image post-processing direction, the preset job data direction, and the preset sheet feed direction.

Figure 10:
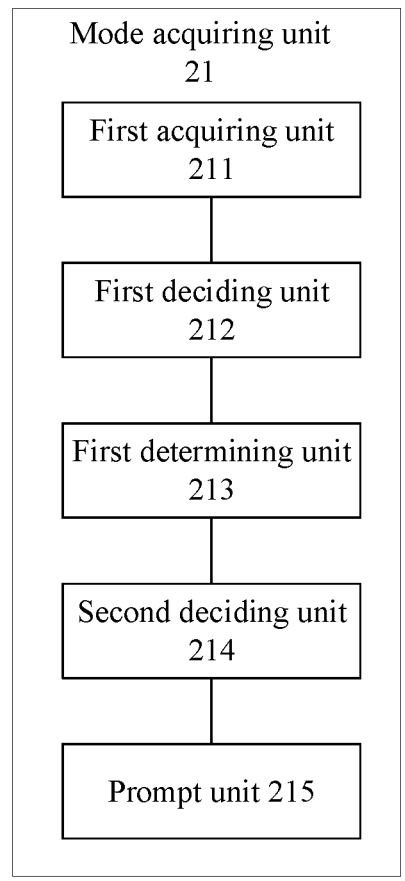
FIG. 10 illustrates a structural schematic of a mode acquiring unit provided by exemplary embodiments of the present disclosure.

Referring to FIG. 10, in one embodiment, the mode acquiring unit 21 may include a first acquiring unit 211, a first deciding unit 212, a first determining unit 213, a second deciding unit 214, and a prompt unit 215. The first acquiring unit 211 may be configured to acquire the preset job processing mode. The first deciding unit 212 may be configured to determine whether the preset job processing mode is the preset second mode. When the preset job processing mode is the preset second mode, the first determining unit 213 may be configured to determine the preset sheet feed direction based on the preset second mode. The second deciding unit 214 may be configured to decide whether the preset feed direction, the image post-processing direction, and the job data direction are matched with each other. When the preset feed direction, the image post-processing direction, and the job data direction are not matched with each other, the prompt unit 215 may be configured to prompt the user to perform job processing mode selection to obtain the job processing mode or to determine the job processing mode of current job data based on candidate job processing modes preset by the user.

In one embodiment, the mode deciding unit 22 may be further configured to decide whether the job processing mode is the preset second mode. When the job processing mode is the preset second mode, the mode determining unit 23 may be further configured to determine the preset sheet feed direction based on the preset second mode. The mode deciding unit 22 may be further configured to decide whether the preset feed direction, the image post-processing direction, and the job data direction are matched with each other. When the preset feed direction, the image post-processing direction, and the job data direction are not matched with each other, the control module 30 may be further configured to control the image post-processing device to stop performing the image post-processing operation.

Figure 11:
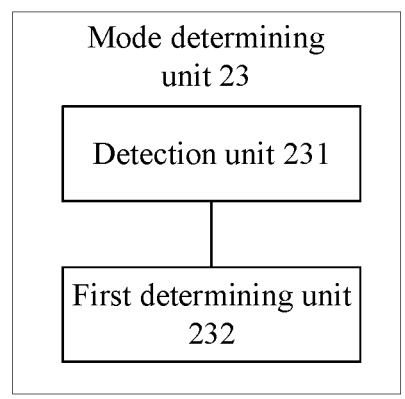
FIG. 11 illustrates a structural schematic of a mode determining unit provided by exemplary embodiments of the present disclosure.

Referring to FIG. 11, in one embodiment, the mode determining unit 23 may further include a detection unit 231 and the first determining unit 232. The detection unit 231 may be configured to detect whether there is a sheet in the first direction. When there is a sheet in the first direction, the first determining unit 232 may configure the first direction as the feed direction, and when there is no sheet in the first direction and there is a sheet in the second direction, the first determining unit 232 may configure the second direction as the feed direction.

In the image forming control method of the present disclosure, the sheet feed direction may be determined according to the image post-processing direction and the job data direction; and the image forming device may be controlled to perform the image forming operation and the image post-processing device may be controlled to perform the image post-processing operation based on the sheet feed direction, the job data, the job data direction, and the image post-processing direction. Therefore, the sheet feed direction can be matched with the image post-processing direction, and the image post-processing device can perform the image post-processing operation on the sheet, thereby meeting the user's image post-processing requirement.

The above-mentioned image forming control apparatus may be included in the image forming apparatus, for example, may be included in the control part of the image forming device A shown in FIG. 1, or may be included in a terminal device that communicates with the image forming device A.

Embodiments of the present disclosure further provide an image forming apparatus including an image forming control apparatus. The image forming control apparatus includes a memory for storing a computer program for an image forming control method; and a processor coupled to the memory and configured, when the computer program being executed, to: acquire job data and job parameters corresponding to the job data, where the job parameters include an image post-processing direction and a job data direction; determine a sheet feed direction based on the image post-processing direction and the job data direction in conjunction with a pre-stored corresponding relationship for characterizing a preset image post-processing direction, a preset job data direction, and a preset sheet feed direction; and based on the sheet feed direction, the job data, the job data direction, and the image post-processing direction, control an image forming device to perform an image forming operation, and control an image post-processing device to perform an image post-processing operation.

Embodiments of the present disclosure further provide a non-transitory computer-readable storage medium containing a computer program, and when being executed, the computer program causes a processor to implement an image forming control method. The method includes acquiring job data and job parameters corresponding to the job data, where the job parameters include an image post-processing direction and a job data direction; determining a sheet feed direction based on the image post-processing direction and the job data direction in conjunction with a pre-stored corresponding relationship for characterizing a preset image post-processing direction, a preset job data direction, and a preset sheet feed direction; and based on the sheet feed direction, the job data, the job data direction, and the image post-processing direction, controlling an image forming device to perform an image forming operation, and controlling an image post-processing device to perform an image post-processing operation.

Embodiments of the present disclosure further provide a computer device. The computer device may include a memory, a processor, and a computer program stored in the memory and executable on the processor, when executing the computer program, the processor may implement the image forming control method described in any one of above-mentioned embodiments.

The technical features of the above-mentioned embodiments may be combined arbitrarily. For brevity, all possible combinations of the technical features in above-mentioned embodiments have not been described. However, the technical features should fall within the scope of the present disclosure if there is no contradiction.

From the above-mentioned embodiments, it may be seen that the solutions provided by the present disclosure may achieve at least the following beneficial effects.

The sheet feed direction may be determined according to the image post-processing direction and the job data direction; and the image forming apparatus may be controlled to perform the image forming operation and the image post-processing apparatus may be controlled to perform the image post-processing operation based on the sheet feed direction, the job data, the job data direction, and the image post-processing direction. Therefore, the sheet feed direction can be matched with the image post-processing direction, and the image post-processing device can perform the image post-processing operation on the sheet, thereby meeting the user's image post-processing requirement.

The above-mentioned embodiments only represent certain embodiments of the present disclosure, and the descriptions thereof are relatively specific and detailed, but should not be considered as a limitation on the scope of the present disclosure. It should be noted that, for those skilled in the art, without departing from the concept of the present disclosure, certain modifications and improvements may be made, which all belong to the protection scope of the present disclosure. Therefore, the protection scope of the present disclosure shall be subject to the appended claims.

What is claimed is:

1. An image forming control method, applied to an image forming control apparatus, the method comprising:
    acquiring a job processing mode;
    determining a sheet feed direction based on whether the job processing mode is a preset first mode or a preset second mode, by:
        in response to determining the job processing mode is the preset first mode, acquiring an image post-processing direction and a job data direction and determining the sheet feed direction based on the image post-processing direction and the job data direction in conjunction with a pre-stored corresponding relationship for characterizing a preset image post-processing direction, a preset job data direction, and a preset sheet feed direction; and
        in response to determining the job processing mode is the preset second mode, setting a long edge feed as the preset sheet feed, or prompting a user to select a job processing mode to obtain the job processing mode or determining a job processing mode of current job data based on candidate job processing modes preset by the user; and
    based on the sheet feed direction controlling the image forming apparatus to perform an image forming operation, and controlling an image post-processing device to perform an image post-processing operation.

2. The method according to claim 1, wherein determining the sheet feed direction further comprises:
    acquiring the preset sheet feed direction;
    deciding whether the preset sheet feed direction, the job data direction, and the image post-processing direction are matched with each other;
    in response to a determination that the preset sheet feed direction, the job data direction, and the image post-processing direction are matched with each other, determining the preset sheet feed direction to be the sheet feed direction.

3. The method according to claim 1, wherein determining the preset sheet feed direction based on the preset second mode comprises:
    in response to a determination that the preset sheet feed direction, the image post-processing direction and the job data direction are not matched with each other, controlling the image post-processing device to stop executing the image post-processing operation.

4. The method according to claim 1, wherein the job processing mode is the preset first mode, and the sheet feed direction is determined by:
    in response to a determination that the image post-processing direction is left or right binding, and the job data direction is vertical, determining the sheet feed direction as the long edge feed.

5. The method according to claim 1, further comprising:
    determining the job processing mode is a preset third mode;
    determining the sheet feed direction further based on the preset third mode; and
    in the preset third mode, the image forming section only load sheets of the long edge feed and not load sheets of the short edge feed, when there are no sheets of the long edge feed in the paper, transmitting a prompt message to add sheets of the long edge feed but not sheets of a short edge feed.

6. The method according to claim 1, further comprising:
    determining the job processing mode is a preset fourth mode;
    determining the sheet feed direction further based on the preset fourth mode; and
    prioritizing the long edge feed over a short edge feed.

7. An image forming apparatus, comprising: an image forming control apparatus, comprising: a memory for storing a computer program for an image forming control method; and a processor coupled to the memory and configured, when the computer program being executed, to:
    acquiring a job processing mode;

determine a sheet feed direction based on whether the job processing mode is a preset first mode or a preset second mode, by:
  in response to determining the job processing mode is the preset first mode, acquiring an image post-processing direction and a job data direction, and determining the sheet feed direction based on the image post-processing direction and the job data direction in conjunction with a pre-stored corresponding relationship for characterizing a preset image post-processing direction, a preset job data direction, and a preset sheet feed direction; and
  in response to determining the job processing mode is the preset second mode, setting a long edge feed as the preset sheet feed, or prompting a user to select a job processing mode to obtain the job processing mode or determining a job processing mode of current job data based on candidate job processing modes preset by the user; and
based on the sheet feed direction, control the image forming apparatus to perform an image forming operation, and control an image post-processing device to perform an image post-processing operation.

8. The apparatus according to claim 7, wherein for determining the sheet feed direction, the processor is further configured to:
  acquire the preset sheet feed direction;
  decide whether the preset sheet feed direction, the job data direction, and the image post-processing direction are matched with each other;
  in response to a determination that the preset sheet feed direction, the job data direction, and the image post-processing direction are matched with each other, determine the preset sheet feed direction to be the sheet feed direction.

9. The apparatus according to claim 7, wherein the processor is further configured to:
  in response to a determination that the preset sheet feed direction, the image post-processing direction and the job data direction are not matched with each other, control the image post-processing device to stop executing the image post-processing operation.

10. A non-transitory computer-readable storage medium containing a computer program, and when being executed, the computer program causes a processor to implement an image forming control method, the method comprising:
  acquiring a job processing mode;
  determining a sheet feed direction based on whether the job processing mode is a preset first mode or a preset second mode, by:
    in response to determining the job processing mode is a preset first mode, acquiring an image post-processing direction and a job data direction, determining the sheet feed direction based on the image post-processing direction and the job data direction in conjunction with a pre-stored corresponding relationship for characterizing a preset image post-processing direction, a preset job data direction, and a preset sheet feed direction; and
    in response to determining the job processing mode is the preset second mode, setting a long edge feed as the preset sheet feed, or prompting a user to select a job processing mode to obtain the job processing mode or determining a job processing mode of current job data based on candidate job processing modes preset by the user; and
  based on the sheet feed direction, controlling an image forming apparatus to perform an image forming operation, and controlling an image post-processing device to perform an image post-processing operation.

11. The non-transitory storage medium according to claim 10, wherein determining the sheet feed direction further includes:
  acquiring the preset sheet feed direction;
  deciding whether the preset sheet feed direction, the job data direction, and the image post-processing direction are matched with each other;
  in response to a determination that the preset sheet feed direction, the job data direction, and the image post-processing direction are matched with each other, determining the preset sheet feed direction to be the sheet feed direction.

12. The non-transitory storage medium according to claim 10, wherein determining the preset sheet feed direction based on the preset second mode further includes:
  in response to a determination that when the preset sheet feed direction, the image post-processing direction and the job data direction are not matched with each other, controlling the image post-processing device to stop executing the image post-processing operation.

* * * * *